United States Patent [19]

Kobayashi et al.

[11] 4,410,819

[45] Oct. 18, 1983

[54] ELECTROMAGNETIC COUPLING DEVICE

[76] Inventors: Takanori Kobayashi; Masahisa Kato; Hiroshi Kumatani, all c/o Mitsubishi Denki Kabushiki Kaisha Nagoya Works, No. 1-14, Yadaminami 5-chrome, Higashi-ku, Nagoya-shi, Aichi, Japan

[21] Appl. No.: 171,856

[22] Filed: Jul. 24, 1980

[30] Foreign Application Priority Data

| Jul. 25, 1979 | [JP] | Japan | 54-94561 |
| Jul. 25, 1979 | [JP] | Japan | 54-94562 |
| Jul. 25, 1979 | [JP] | Japan | 54-94563 |
| Jul. 25, 1979 | [JP] | Japan | 54-94564 |
| Jul. 25, 1979 | [JP] | Japan | 54-94565 |
| Jul. 25, 1979 | [JP] | Japan | 54-94566 |
| Jul. 25, 1979 | [JP] | Japan | 54-94567 |
| Aug. 28, 1979 | [JP] | Japan | 54-109311 |

[51] Int. Cl.³ .............................. H02K 49/02
[52] U.S. Cl. .................................... 310/105
[58] Field of Search ..................... 310/92, 93, 105

[56] References Cited

U.S. PATENT DOCUMENTS 2,701,315  2/1955  Winther ........................ 310/105
2,817,029  12/1957  Jaeschke .................... 310/105 X Primary Examiner—Donovan F. Duggan
Attorney, Agent, or Firm—Sughrue, Mion, Zinn, Macpeak & Seas

[57] ABSTRACT

An electromagnetic coupling device including a drive member coupled to the rotary shaft of an electric morot and a follower operating in response to the drive member. The drive member includes first and second magnet pole pieces and a magnetic path forming member. The drive member having a relatively large inertia, serves also as a flywheel. The follower is made to have a relatively small inertia to improve its response characteristic. The drive member has a space incorporating a fixed exciting coil and a fixed magnetic path forming member and a clearance accomodating eddy current generating plate thereby reducing the overall axial dimension of the electromagnetic coupling device.

12 Claims, 4 Drawing Figures

ELECTROMAGNETIC COUPLING DEVICE

BACKGROUND OF THE INVENTION

The present invention relates to improved electromagnetic coupling devices. More specifically, the invention relates to an electromagnetic coupling device suitable for driving, for instance, sewing machines, which must be stopped quite frequently and must respond quickly in a variable speed operation.

Electric motors having frictional clutches and brakes which are designed to be stopped frequently, namely so-called "clutch motors," have been extensively employed to drive sewing machines especially industrial sewing machines. A clutch motor with an automatic needle positioner is known in the art in which the clutch motor is so designed that the needle can be stopped at a predetermined position by providing the clutch motor a positioning low speed drive function. This improved clutch motor has come into wide use in association with the provision of a automatic thread cutting device for sewing machines which together contribute greatly to improving the efficiency of sewing work.

However, such a clutch motor with an automatic needle positioner is disadvantageous in the following point. A variable speed characteristic is provided for the clutch motor by controlling the frictional clutch and the brakes, that is, by varying the slip condition of the clutch. It is difficult to set the optimum values of positioning speed and thread cutting speed when the clutch motor is operated in a low speed range and the frictional material of the clutch plates tends to wear out quickly which makes it necessary to inspect the clutch at frequent intervals.

In order to eliminate the above-described difficulties and to provide both an improved variable speed characteristic and an improved low speed characteristic, a technique has been proposed in the art in which a sewing machine is driven by a contactless variable speed motor, that is, an electric motor utilizing electromagnetic coupling. An example of such a motor is described in Japanese Pat. No. 699,108.

In order to frequently run and stop the electric motor driving the sewing machine, it is desirable that the inertia at the output shaft driving the sewing machine be lower than that at the rotary shaft of the electric motor preferably with the ratio of the two being less than 1/5. An electromagnetic coupling designed to meet such a requirement is disclosed in U.S. Pat. No. 3,910,211. An electromagnetic coupling for an electric motor in which the inertia at the output shaft is further decreased is disclosed in Japanese Utility Model No. 960,895.

However, electric motors which electromagnetic couplings of the type disclosed by these publications have not found practical use because of the following drawbacks. In the electromagnetic coupling of U.S. Pat. No. 3,910,211, a drive member is provided for the electromagnetic coupling by providing a drum and a cooling fan on the end face of a flywheel which is secured to the rotary shaft of the electric motor, a driven member or a follower of the electromagnetic coupling by fixedly securing to the output shaft a magnetic pole member having magnetic pole pieces confronting one another through a gap with the inner surface of the drum and a yoke supporting the magnetic pole piece. The magnetic pole member accordingly is U-shaped in partial section. An exciting coil secured to a part of the housing of the electric motor is held in a spaced relation with the U-shaped magnetic pole member of the follower. For an electric motor with an electromagnetic coupling of the type described in U.S. Pat. No. 3,910,211, the inertia at the output shaft is smaller than that at the rotary shaft when compared with an electric motor having an electromagnetic coupling in which the drum forming the electromagnetic coupling is secured directly to the output shaft and the inductor of the electromagnetic coupling is secured to the rotary shaft of the motor.

However, if the magnetic pole member is secured to the output shaft in the case where, as in the above-mentioned U.S. patent, the drum is arranged at the rotary shaft side, it is necessary to provide a predetermined relatively large size magnetic path sectional area for the magnetic pole member. Accordingly, the resulting construction is necessarily bulky and high in inertia because the magnetic pole member is able to effectively pass magnetic flux induced by the exciting coil without loss. Because of this, the inertia at the output shaft is not decreased as desired and the ratio of the output shaft torque to the output shaft inertia is undesirably small. Thus, an electric motor having an electromagnetic coupling of the type described in U.S. Pat. No. 3,910,211 is not practically applicable to a case where the motor should be accelerated or decelerated quickly such as on the order of 0.1 to 0.2 seconds as required for motors used for driving sewing machines.

Furthermore, in an electric motor having an electromagnetic coupling as in the above-mentioned U.S. patent, the flywheel serving as the drum must be provided separately from the magnetic pole member and as a result the number of components and the number of manufacturing steps required are increased. As the flywheel is arranged axially of the magnetic pole member, the longitudinal dimension of the electric motor must be increased accordingly.

In addition, in the electric motor having an electromagnetic coupling as described in this patent, the cooling fan is attached to or formed integrally with the flywheel with the flow of air provided by the cooling fan directed from the outer end of the output shaft toward the outer end of the rotary shaft of the electric motor. Since the operator must position himself at the unloaded side of a sewing machine when the machine is being driven by the electric motor, the flow of air is directed towards him. This can be an unpleasant annoyance or even a potential health hazard.

In the aforementioned Japenese Utility Model No. 960,895 there are proposed two types of electromagnetic couplings which are different from that in the above-mentioned U.S. patent. In one of the two types of electromagnetic couplings, the drive member of the electromagnetic coupling is constituted by a magnetic pole member which is U-shaped in partial section and which has magnetic pole pieces arranged to alternately engage with one another in a circumferential direction, a magnetic path forming member mounted on the magnetic pole member with a non-magnetic support confronting the magnetic pole pieces with a gap therebetween, and an exciting coil fixedly provided for the magnetic pole member. The drive member is fixedly secured to the rotary shaft of the electric motor at the center of the magnetic pole member. The follower for the electromagnetic coupling is constructed of an eddy current generating plate mounted on the output shaft in such a manner that the eddy current generating plate is interposed in the gap between the magnetic pole pieces and the magnetic path forming member.

An electromagnetic coupling of this type has a highly responsive speed variation characteristic because the electromagnetic coupling follower is constructed with a disc-shaped eddy current generating plate so that the inertia of the output shaft is low. However, it is still disadvantageous in that, as the exciting coil is integrally secured to the magnetic pole member, the exciting coil must be rotated as a part of the drive member with the rotary shaft. This involves a problem in that terminals such as slip rings must be provided for applying current to the exciting coil. The use of slip rings to supply current to the exciting coil makes the construction of the electric motor intricate and is accompanied by a necessity for inspecting the slip rings for wear. Thus, the employment of such an electromagnetic coupling has not proved practical.

In another type of electromagnetic coupling, the use of the slip rings is eliminated in order to overcome the above-described difficulties. Such an electromagnetic coupling is substantially similar to that described in the specification of Japanese Pat. No. 699,108. In this electromagnetic coupling, a yoke which is U-shaped in partial section is formed by separating a part of the magnetic pole member so as to accommodate the exciting coil and the yoke is mounted in the housing of the electric motor in such a manner as to confront the remaining part of the magnetic pole piece which is attached to the rotary shaft with a gap therebetween thus forming a magnetic circuit.

With this arrangement, no slip rings are needed because the exciting coil remains stationary. However, the arrangement has another drawback as follows. As described above, a part of the magnetic pole member secured to the rotary shaft of the electric motor is separated and used as the yoke where the exciting coil is provided. With this construction the weight of the magnetic pole member is reduced by the weight of the part thus separated so that the inertia of the rotary shaft is correspondingly decreased. Since the desired speed variable character is established by the electromagnetic coupling in a contactless clutch arrangement, even if the inertia at the output shaft is reduced, the reduction of the inertia of the rotary shaft cancels the reduction of the inertia of the output shaft as a result of which the performance is unavoidably lowered. Thus, such an electromagnetic coupling is not useful with an electric motor which must be frequently stopped and which requires a high responsive variation characteristic as in the case of an electric motor driving a sewing machine.

This difficulty may be eliminated by employing a flywheel. However, the use of flywheel produces additional problems in that the number of components and the number of manufacturing steps are increased by as many as are required for the addition of the flywheel and furthermore it is necessary to provide a space for installing the flywheel as a result of which the overall dimensions of the electric motor are increased.

In an electromagnetic coupling of this type, the magnetic pole member confronts the yoke in the axial direction and therefore the magnetic attraction force of the yoke is imparted to the magnetic pole member. Thus, it is necessary to provide some way of counterbalancing such a force.

In each of the two types of electromagnetic couplings disclosed in the above-described Japanese utility model, the output shaft follower is constituted by a disc-shaped eddy current generating plate. The eddy current generating plate is disadvantageous in that it has a low rigidity because of its configuration and is liable to be deformed by thermal stress due to thermal loss. Because of this difficulty, it is impossible to make the gap small between the magnetic pole pieces and the magnetic path forming member and accordingly the performance is lowered because of the loss of magnetic flux in the gap.

It is stated in the specification of the above-described Japanese utility model that the magnetic pole pieces and the eddy current generating plate may be arranged in the gap in a radial direction instead of in an axial direction. However, it is submitted that what is intended by the statement is vague because no actual construction or example thereof is given. It is assumed that the statement refers to the formation of a cup-shaped eddy current generating plate. If this is true the problems of deformation of the eddy current generating plate and the decrease in the performance due to a magnetic flux loss in the gap which is limited by the deformation of the eddy current generating plate can be eliminated. However, the remaining problems mentioned above remain. No way of solving these problems is described in that specification.

SUMMARY OF THE INVENTION

Accordingly, a first object of this invention is to provide a novel, improved electromagnetic coupling device in which the above-described difficulties accompanying a conventional electromagnetic coupling or an electric motor with the conventional electromagnetic coupling have been eliminated and which is applicable to an electric motor which must be frequently run and stopped and which has a highly responsive speed variation characteristic.

A second object of the invention is to provide an electromagnetic coupling device low in manufacturing cost and high in performance in which the components of an electric motor and the components of an electromagnetic coupling are effectively arranged, all the magnetic path forming members except the exciting coil of the electromagnetic coupling and some magnetic path forming members which support the exciting coil are employed as a rotating drive member for the electromagnetic coupling, the drive member serves also as a flywheel, and the follower of the electromagnetic coupling is constituted by a thin eddy current generating plate whereby the ratio of inertial of the follower to that of the drive member is large and the ratio of torque of the follower to the inertia of the follower is also large.

A third object of the invention is to provide a practical electromagnetic coupling device of high efficiency in which the magnetic path forming member of the rotating drive member is so formed that its partial section is S-shaped, a fixed magnetic path forming member and an exciting coil supported thereby are arranged in a space below the drive member with a predetermined gap therebetween while the eddy current generating plate of the follower is disposed in a narrow gap provided above the magnetic path forming member of S-shaped partial section so that the longitudinal dimension of the electric motor is accordingly reduced and the magnetic path is completed through a short distance outside the exciting coil whereby the magnetomotive force can be effectively used and no thrust is caused by the magnetic attraction force.

A fourth object of the invention is to provide an electromagnetic coupling device in which a part of the drive member of an effectively arranged electromagnetic coupling is formed to serve as a cooling fan and the flow of air formed by the cooling fan is directed from the non-load side of an electric motor toward the load side.

A fifth object of the invention is to provide an electromagnetic coupling device in which a cup-shaped eddy current generating plate forming the follower of an electromagnetic coupling is provided by drawing a thin electrically conductive plate with a press so that it can withstand thermal stress sufficiently thereby making it possible to reduce the inertia of the follower and to make it possible to easily attach and unattach the follower from the drive member of the electromagnetic coupling.

A sixth object of the invention is to provide an electromagnetic coupling device in which one of the bearings of the output shaft to which the follower of an electromagnetic coupling is secured is mounted on the rotating drive member of the electromagnetic coupling so that the rotary shaft of an electric motor and the output shaft can accordingly be arranged coaxially with a high accuracy and the relative speed of the inner race and the outer race of the bearing is reduced during a load operation in which load is increased thereby improving the service life of the bearing.

A seventh object of the invention is to provide an electromagnetic coupling device in which an eddy current generating plate formed by drawing a thin, electrically conductive plate is secured to the output shaft through a boss made of electrical conductive material to provide the boss with an end ring effect and in which an increase in resistance of the eddy current generating plate due to the fact that the latter is thin is cancelled by the end ring effect of the boss whereby a reduction in the torque generated at high speeds is prevented.

An eighth object of the invention is to provide an electromagnetic coupling device in which a boss of electrically conductive material used to secure an eddy current generating plate to the output shaft is used to mount the movable plate of an electromagnetic brake whereby the need for providing a movable plate mounting part is eliminated, the inertia of the follower is decreased, frictional heat generated by the movable plate when the brake is operated is radiated through the boss of electrically conductive material, and the service life of the movable plate is accordingly increased.

A ninth object of the invention is to provide an electromagnetic coupling device in which an eddy current generating plate is fixedly mounted on the output shaft and vanes serving also as ribs for mounting the movable plate of an electromagnetic brake are formed on the boss which is rotated with the output shaft so that heat generated in and around the boss is radiated through the vanes thereby to assist cooling the heat generating parts.

A tenth object of the invention is to provide an electromagnetic coupling device in which the components of an electromagnetic coupling and the components of an electromagnetic brake are effectively separated from each other and the separated components are coupled with a bracket supporting the bearing at the load side of the rotary shaft of an electric motor. The rotating drive member of the electromagnetic coupling which serves as a flywheel and as a cooling fan, an output shaft of which one bearing provided therefor is supported by the drive member and a bracket supporting the other bearing of the output shaft to thereby provide sub-assemblies or units. These units are assembled successively in the axial direction of the rotary shaft of the electric motor whereby the device can be readily assembled with high dimensional accuracy.

DESCRIPTION OF THE PREFERRED EMBODIMENTS

Figure 1:
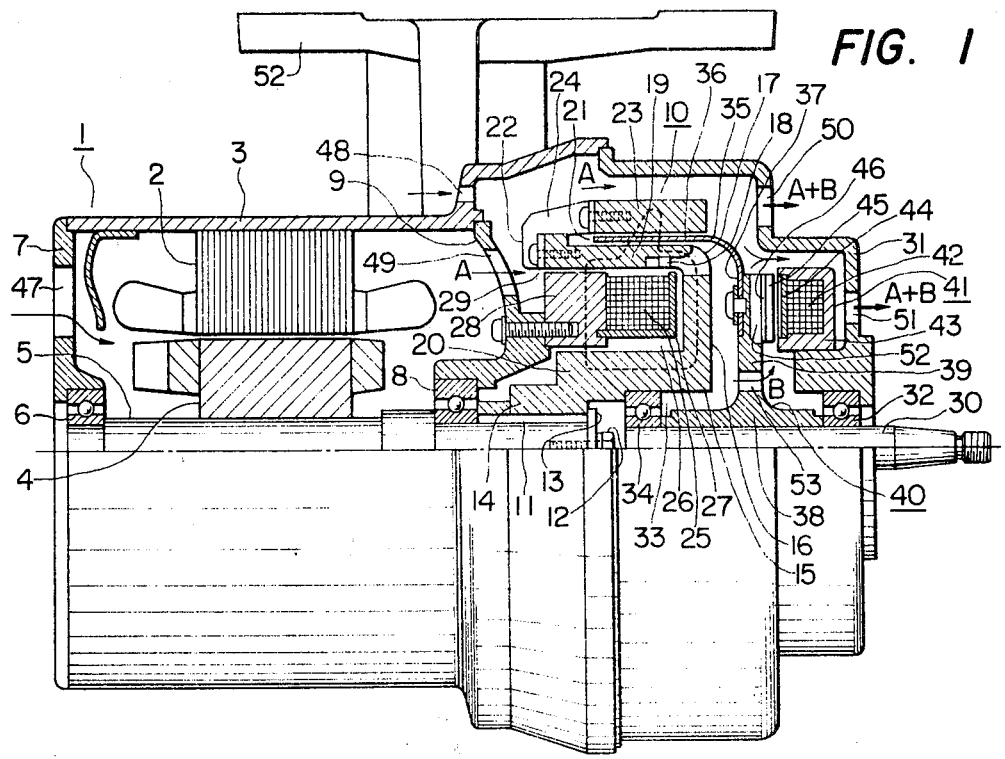
FIG. 1 is a front view, partly as a sectional view, showing an example of an electromagnetic coupling device constructed according to the invention.

The present invention will be described with reference to the accompanying drawings. FIG. 1 is a front view, partly as a sectional view, showing an electric motor with an electromagnetic coupling constructed in accordance with the present invention.

The electric motor shown in FIG. 1 includes a housing 1 which is constituted by a frame 3 supporting the stator 2, a first bracket 7 supporting one bearing to which the rotary shaft 5 of the rotor 4 is fixedly secured, a second bracket 9 supporting the other bearing of the rotary shaft 5, and the drive member 10 of the electromagnetic coupling which is fixedly mounted on an end portion of the rotary shaft 5 which extends beyond the second bracket 9.

The drive member 10 has a magnetic pole member 20 which includes a horizontal section 15 including a mounting section 14 in the central portion of which the rotary shaft 5 is disposed. The rotary shaft 15 is secured thereto by a key slot 11, bolts 12 and a retaining sheet 13. A vertical section 16 extends radially from the horizontal section 15. First magnetic pieces 17 extend in the form of pawls circumferentially and axially from the end of the vertical section 16. Second magnetic pole pieces 19 are arranged to alternately engage with the first magnetic poles 17 with gaps therebetween and are integrally secured to the first magnetic pole pieces 17 through a non-magnetic ring 18. The magnetic pole member 20 is U-shaped in partial section. The drive member 10 further includes a first magnetic path forming member 23 which is arranged coaxially over the magnetic pole pieces 17 and 19 with a predetermined gap therebetween and is secured to the second magnetic pole pieces 19 with a non-magnetic support 22.

As may be seen from FIG. 1, the partial section of the drive member 10 is S-shaped including the magnetic pole member 20, the first magnetic path forming member 23, and the non-magnetic support 22. The drive member 10 includes all of the magnetic path forming members with certain exceptions which will be described later. Accordingly, the drive member 10 serves also as the flywheel of the rotary shaft. The non-magnetic support 22, including plural ribs 24 arranged circumferentially, is in the form of a ring so as to allow cooling air to flow in the direction of the arrow A.

Figure 2:
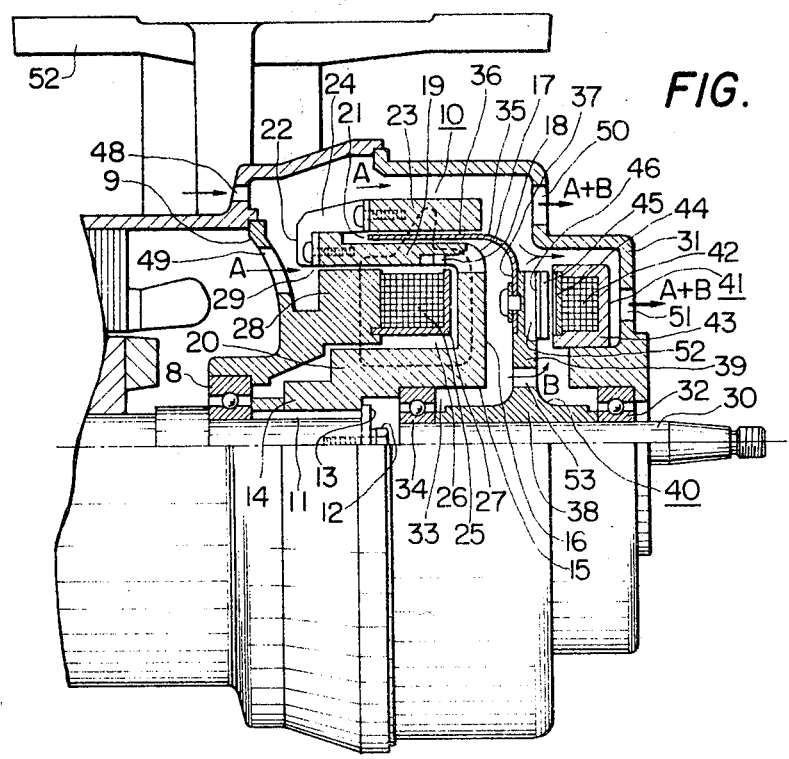
FIGS. 2 through 4 are also front views, partly as sectional views, showing other examples of electromagnetic coupling devices of the invention.
Figure 4:
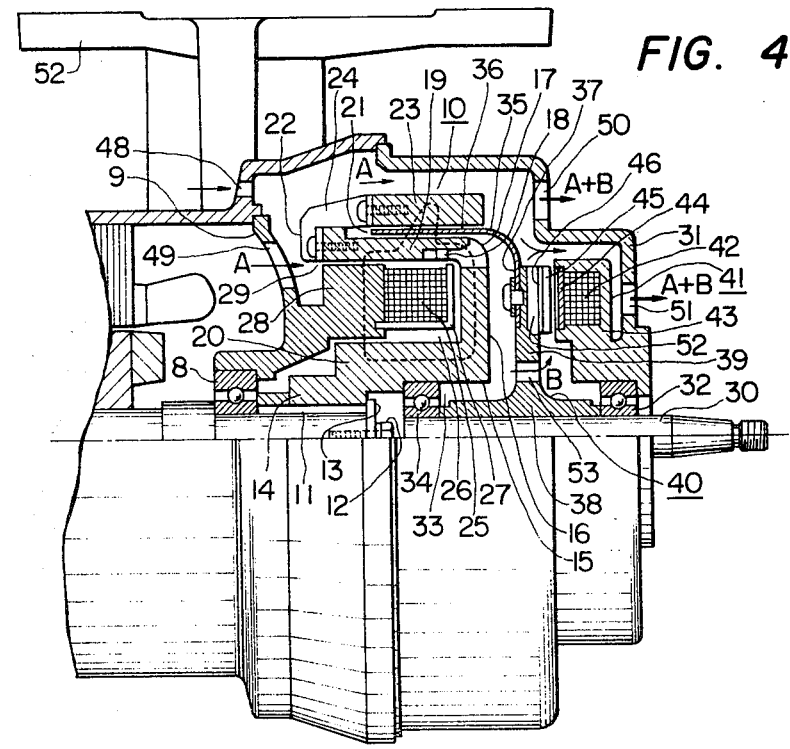

The motor further is provided with an exciting coil 25 in the hollow part 26 of the magnetic pole member 20 with a predetermined space therebetween. The exciting coil 25 is fixedly secured to the bracket 9 through a coil frame 27 and a second magnetic path forming member 28. The second magnetic path forming member 28, which is secured to the bracket 9, closes the magnetic path as it is positioned inside the opening 29 of the magnetic pole member 20. The magnetic path of the second magnetic path forming member 28 is the only part of the path of the drive member 10 which is not rotated and therefore the member 28 may be omitted if a part of the bracket 9 is extended to form a fixed magnetic path as shown in FIGS. 2 or 4.

One end portion of an output shaft 30 is supported through a bearing 32 by a third bracket 31 coupled to the housing 1 while the other end portion thereof is supported by a bearing 34 mounted in a cylindrical hole defined by the horizontal section 15 of the magnetic pole member 20. An eddy current generating plate 35 in the form of a cup is obtained by drawing an electrical conductive material. The circumferential wall 36 of the plate 35 is placed in the gap 21 which is formed between the magnetic path forming member 23 and the magnetic pole pieces 17 and 19. The bobbin 37 of the plate 35 is connected radially in close contact relation to the disc by a boss 38 which is disposed between the bearings 32 and 34 and is fixedly mounted on the output shaft 30. The eddy current generating plate 35 and the boss 38 form follower 40 of the electromagnetic coupling which is U-shaped in partial section.

The radially extended disc 39 of the boss 38 is provided with a plurality of vanes 52 which are arranged radially or spirally and serve a ribs for mounting the movable plate of an electromagnetic brake (described below). Heat generated in the exciting coil 25, the eddy current generating plate 35 and the movable plate of the electromagnetic brake is dissipated by cooling air B which is generated by rotation of the vanes 52. The disc 39 of the boss 38 has a plurality of holes 53 which serve as ventilation holes to discharge the heated air in the space which is defined by the eddy current generating plate 35 and the magnetic pole member 20.

Since the boss 38 is made of electrically conductive material, it compensates for the reduction of sectional area due to the small wall thickness of the eddy current generating plate 35 and provides an end ring effect to prevent a decrease of torque generated. Furthermore, if the boss is made of a material of excellent in electrical conductivity such as aluminum or copper, then the boss will further improve the cooling effected in association with the vanes 52 because such materials are also excellent in their heat transmission characteristic.

The aforementioned electromagnetic brake 41 includes an exciting coil 42 which is incorporated into a yoke 43 which is U-shaped in partial section. The electromagnetic brake 41 further includes a brake lining 44 which is formed and positioned in such a manner as to close the opening of the yoke 43 and a magnetic movable plate 45 which is arranged confronting the brake lining 44 and is secured to the disc 39 of the boss 38 through a thin leaf spring 46 with the ribs forming the vanes 52.

Figure 3:
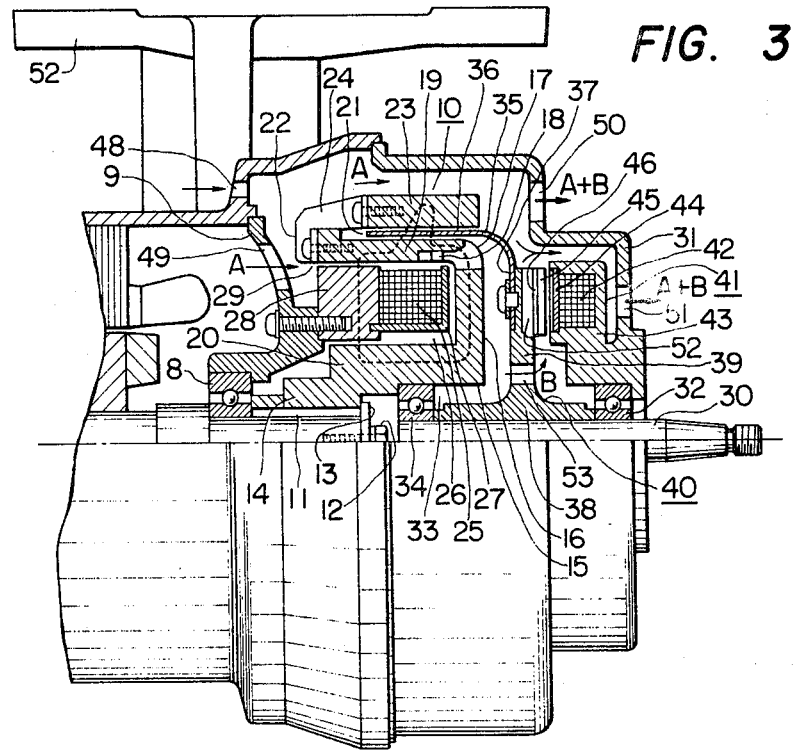

When the exciting coil 42 of the electromagnetic brake 41 is energized and the magnetic flux therefrom flows in the magnetic movable plate 45 through the yoke 43, the movable plate 45 is attracted toward the yoke against the elastic force of the spring 46 thereby providing a braking force. In FIG. 3 or 4, the yoke 43 is shown as being provided separately from the bracket 31 although it may be formed integrally with the bracket 31.

The motor further is provided with ventilation holes 47 through 51 to allow cooling air formed by the vanes of the support 22 and the vanes 52 of the boss 38 to flow in the directions of the arrows or from the non-load side of the motor toward the load side of the motor. The ventilation holes 47 through 51 are provided at suitable positions on the frame 3 and the bracket 7, 9 and 31 forming the housing 1 to cool parts of the stator 2, the electromagnetic coupling, and the electromagnetic brake. In the figure, reference numeral 52 designates mounting legs for mounting the motor.

It is assumed that the rotary shaft 5 of the motor is rotated together with the drive member 10 of the electromagnetic coupling serving also as the flywheel. With this arrangement, when current is applied to the exciting coil 25 of the electromagnetic coupling by the operator, then magnetic flux is generated along a magnetic path which extends from the first magnetic pole pieces 17 of the drive member 10 circumferentially through the first magnetic path forming member 23 to the second magnetic pole pieces 19 and accordingly the eddy current generating plate 35 of the follower 40 crosses the magnetic flux. As a result, an eddy current is formed in the eddy current generating plate 35 and a resultant electromagnetic force is transmitted through the boss 38 to the output shaft 30 so that a load such as for instance a sewing machine coupled to the output shaft 30 is accelerated in a short time.

In this respect, the torque generated in the follower 40 can be controlled by adjusting the current in the exciting coil 25 by an instruction signal the state of which is set by the operator to operate the load at a desired speed.

The force transmitted to the follower 40 is eliminated by interrupting the current flowing in the exciting coil. Upon interrupting the current flow, the electromagnetic brake 41 is operated to bring the movable plate 45 into contact with the brake lining 44 thereby producing a braking force as a result of which the rotation of the output shaft 30 is quickly stopped.

Control of the load coupled to the output shaft 30 depends on the specific type of the load used and is not directly related to the present invention. Therefore, the description of the control of the load will be omitted. However, in the case of a sewing machine, it can be controlled as described in the specifications, for instance, of the aforementioned Japanese Patent No. 699108 and U.S. Pat. No. 3,910,211.

The electromagnetic coupling device of the invention as described above can be assembled as follows. In the first step of assembly, the frame 3 on which the stator 2 has been mounted, the rotary shaft 5 on which the rotor 4 and the bearings 6 and 8 have been mounted, the first bracket 7, and the second bracket 9 on which the exciting coil 25 of the electromagnetic coupling together with the second magnetic path forming member 28 have been mounted are assembled as in a conventional method of assembling an electric motor.

In the speed step, the rotating drive member 10 of the electromagnetic coupling which has been constructed as an integral unit with the magnetic pole member 20 having the first and second magnetic pole pieces 17 and 19, the first magnetic path forming member 23, etc. and which serves as the flywheel and the cooling fan also, is mounted on the rotary shaft 51. That is, the mounting section 14 of the drive member 10 is inserted into the rotary shaft 5 through the key slot 11 and is fixedly secured thereto by the retaining seat 13 and the bolts 12 in such a manner that the exciting coil 25 and secured magnetic path forming member 28 are accommodated coaxially in the hollow part 26 of the drive member 10.

In the third step, the bearings 32 and 34 are mounted on the ends of the output shaft on which the boss 38 forming the follower 40 of the electromagnetic coupling with the cup-shaped eddy current generating plate 35 and the movable plate 45 of the electromagnetic brake 41 has been mounted. The bearing 34 of the output shaft 30 is inserted into the cylindrical hole 33 in the central portion of the drive member 10 so that the cylindrical wall 36 of the eddy curent generating plate 33 is arranged coaxially in the gap 21 of the drive member.

In this last step, the other bearing 32 of the output shaft 30 is mounted in the third bracket 31 on which the yoke 43 with the exciting coil 42 and the brake lining 44 of the electromagnetic brake 41 has been mounted in such a manner that the yoke 43 confronts the movable plate 45. The edge portion of the bracket 31 is connected to the frame 3. At this point, the assembling operation has been completed.

As is clear from the above description, the assembling operation is carried out generally in four steps advancing in the axial direction of the rotary shaft of the electric motor. Since in each of the steps, sub-assemblies which have been previously formed into units are utilized, the assembling operation can be achieved readily in a short time and with less labor. Furthermore, dimensional accuracy in the diametric direction can be readily controlled and dimensionally errors are substantially entirely eliminated during the assembly operation.

The electromagnetic coupling device of the invention can be readily disassembled by reversing the above-described steps. Thus, maintenance and inspection, and part replacement of the device can be readily achieved.

As is clear from the above description, the rotating drive member 10 of the electromagnetic coupling, which is constituted by the magnetic pole member 20 with the first and second magnetic pole pieces 17 and 19 assembled through the non-magnetic ring 18 and the magnetic path forming member 23 coupled through the non-magnetic support 22 to the magnetic pole member 20, with the exception of the magnetic path forming member and the exciting coil of the electromagnetic coupling, is provided with all the magnetic path forming members. Therefore, the drive member 10 can also serve as the flywheel. As the follower of the electromagnetic coupling has no magnetic path forming member, the inertia of the follower reduced accordingly. Thus, the electromagnetic coupling device of the invention, because it can easily be run and be stopped quite frequently, can respond quickly to speed variations, can withstand transmission torque or load torque which is applied thereto abruptly and frequently, and can prevent a reduction in the speed of the torary shaft of the electric motor, fulfills all of the requirements mentioned above for a motor for driving a sewing machine.

According to the invention, the fixed exciting coil and the magnetic path forming member are accommodated in the hollow part of the magnetic pole member with a predetermined space therebetween thereby forming the rotating drive member of the electromagnetic coupling while serving simultaneously as the flywheel. Therefore, the axial dimension of the overall motor can be reduced. As the magnetic path in which the magnetic flux flows is completed through a short distance outside the exciting coil, the electromagnetic force generated can be economically and effectively utilized. Thus, the device of the invention is small in size and high in efficiency.

Furthermore, according to the invention, the cooling fan provided in the drive member 10 causes the cooling air to flow from the non-load side toward the load side. Therefore, an operator positioned at the non-load side will not have the discharged air blown at him.

In accordance with the invention, the boss forming the follower of the electromagnetic coupling, which is fixedly secured to the output shaft, is made of a heat conducting material such as aluminum. Therefore, the boss functions as a heat radiator for dissipating heat generating by the eddy current generating plate and the movable plate of the electromagnetic brake. That is, the boss effectively dissipates the heat in association with the cooling fan of the driving member.

The drive member continues to rotate at a predetermined speed when energized and the cooling fan is provided in the drive member. Therefore, during times of no-load operations in which the electromagnetic coupling is disconnected or during low speed operation in which the exciting current of the electromagnetic coupling is reduced, cooling is nonetheless effected by a constant flow rate of cooling air.

Furthermore, according to the invention, the vanes generating the cooling air are formed on the boss forming the follower of the electromagnetic coupling to thereby quickly dissipate heat provided by the exciting coil, the eddy current generating plate, etc. Thus, the cooling effect of the electromagnetic coupling device of the invention is further improved.

In addition, in accordance with the invention, the movable plate of the electromagntic brake is mounted on the boss forming the follower of the electromagnetic coupling. Therefore, it is unnecessary to additionally provide a separate mount for the movable plate. As the boss serves as the heat radiating plate which dissipates frictionally-generated heat produced during a braking operation, the service life of the movable plate of the brake is lengthened.

According to the invention, the follower 40 of the electromagnetic coupling includes no member forming the magnetic path of the drive member 10 and it is made up of the cup-shaped eddy current generating plate 35 manufactured by drawing a ratio of the drive member and the follower is increased. As the drive member is coupled magnetically to the follower in the gap extended radially and parallel to the axis of the electromagnetic coupling device, the device easily can be assembled or disassembled. The eddy current generating plate can be manufactured by pressing or the like as described above. Accordingly, the eddy current generating plate used with the invention is low in manufacturing cost and its inside and outside diameters precisely maintained. Since the eddy current generating plate is cup-shaped, it has a high rigidity. That is, it can withstand considerably high thermal stress. Because of these advantages, the above-described gap may be made narrow which results in a high efficiency.

The eddy current generating plate is made relatively thin in order to reduce the magnetic gap and the inertia. Accordingly, the eddy current flowing circuit is small in sectional area and accordingly high in resistance. Thus, its torque is low in the high speed range. However, according to the invention, the increase of the circuit resistance due to the reduction in thickness of the eddy current generating plate is cancelled so that the plate provide a high torque because the thin eddy current generating plate is brought into close contact with the boss made of electrically conductive material and is fixedly mounted to the output shaft through the boss so that the boss of electrically conductive material provides an end ring effect.

In accordance with another embodiment of the invention, the bearing 34 supporting one end portion of the output shaft 30 is supported by the magnetic pole member 20 forming the drive member 10 of the electromagnetic coupling which is rotated by the input shaft, namely the rotary shaft 5. Therefore, the outer race of the bearing 34 is retained on the magnetic pole member 20 by the attractive force of leakage magnetic flux or by residual magnetic flux from the exciting coil 25 thereby preventing the bearing from creeping. During a load operation in which the load applied to the bearing is increased, the speed of the output shaft 30 approaches that of the rotary shaft 5 and the relative speed of the outer race and the inner race of the bearing 34 is decreased thereby improving the service like of the bearing remarkably and making it possible to reduce the size of the bearing. In addition, it is possible to provide the desired distance between the bearings 32 and 34 of the output shaft 30 suitably without increasing the axial dimension of the motor. As the output shaft 30 is supported directly by the magnetic pole member 20 without any additional structure, the output shaft 30 and accordingly the follower 40 and the drive member 10 made up of the magnetic pole member 20 and the magnetic path forming member 23 can be arranged coaxially with high accuracy and the gaps therebetween can be minimized.

Furthermore, in accordance with the invention, the horizontal section 15 including the mounging portion 14, the first and second magnetic pole pieces 17 and 19, the first magnetic path forming member 23 are arranged radially so that the mass, in a radial direction, of the drive member 10 is increased. That is, the inertia of the drive member 10 is increased, thus maintaining the performance of the electromagnetic coupling unchanged. In addition to this, as the first and second magnetic pole pieces 17 and 19 and the first magnetic path forming member 23 are disposed radially outwardly to form a relatively large space for accommodating the fixed exciting coil 25, the inertia of the drive member can be increased.

What is claimed is:

1. An electromagnetic coupling device for selectively transmitting the rotary motion of a drive rotary shaft to an output rotary shaft, comprising:

said drive rotary shaft;

a magnetic drive member fixed to said drive rotary shaft, said magnetic drive member having generally an S-shape and comprising (a) a generally cylindrically shaped first magnetic pole member fixed directly to said drive rotary shaft, (b) a generally annularly shaped second magnetic pole member extending radially outwardly from a forward side of said first magnetic pole member and magnetically coupled to said first magnetic pole member, an outer portion of said second magnetic pole member being formed as a plurality of pawls extending circumferentially and axially, (c) a generally cylindrically shaped third magnetic pole member extending rearwardly from an outward portion of said second magnetic pole member parallel to said first magnetic pole member with a relatively wide first gap therebetween, said third magnetic pole member comprising a plurality of magnetic pole pieces engaged alternating with said pawls with gaps therebetween, (d) a non-magnetic ring interconnecting said second and third magnetic pole members, (e) a non-magnetic support member having an inward end fixed to a rearward end of said third magnetic pole member, and (f) a generally cylindrically shaped fourth magnetic pole member having an uninterrupted cylindrical surface and having a rearward end fixed to an outward end of said non-magnetic support member, said fourth magnetic pole member extending parallel to said first and third magnetic pole member with a relatively narrow second gap being formed between said third and fourth magnetic pole members;

a stationarily mounted magnetic pole member extending into a rearward portion of said first gap;

an exciting coil fixed to said stationarily mounted magnetic pole member and extending into a forward portion of said first gap;

said output shaft; and a generally U-shaped follower comprising (a) a boss fixedly directly to said output shaft, (b) a radially extending disc fixed to said boss, and (c) a conductive plate fixed to said disc, said conductive plate having a generally cylindrically shaped portion extending through said second gap parallel to said first, third and fourth magnetic pole members.

2. The electromagnetic coupling device of claim 1, further comprising a rotor coil fixed to said drive rotary shaft; a housing; and a stator coil fixed to said housing and opposing said rotor coil.

3. The electromagnetic coupling device of claim 1, wherein at least a portion of said first magnetic pole member extends forwardly over a rearward portion of said output shaft; and further comprising a bearing disposed between an inside surface of said first magnetic pole member and a rearward end of said output shaft for supporting said first magnetic pole member.

4. The electromagnetic coupling device of claim 1, wherein said non-magnetic support member comprises a plurality of ribs for generating a current of air.

5. The electromagnetic coupling device of claim 1, further comprising braking means for braking rotary motion of said output shaft.

6. The electromagnetic coupling device of claim 5, wherein said braking means comprise a stationarily mounted second exciting coil; a magnetically movable plate disposed opposite a pole face of said second exciting coil; and spring means for coupling said magnetic movable plate to said radially extending disc.

7. The electromagnetic coupling device of claim 2, further comprising a bracket fixed to a central interior portion of said housing, said bracket being positioned between said stator coil and said non-magnetic support member, an aperture being formed in said bracket adjacent said non-magnetic support member.

8. The electromagnetic coupling device of claim 7, further comprising a first bearing fixed to a rearward end of said housing and a second bearing fixed to an inward end of said bracket for supporting said drive rotary shaft.

9. The electromagnetic coupling device of claim 8, wherein a plurality of apertures are formed in each of said radially extending disc, said magnetic drive member adjacent a juncture between said second and third magnetic pole members, and in forward and rearward ends of said casing.

10. The electromagnetic coupling device of claim 8, wherein said boss is made of an electrically conductive material having a high thermal conductivity.

11. The electromagnetic coupling device of claim 8, wherein said conductive plate is cup-shaped.

12. The electromagnetic coupling device of claim 8, wherein said boss comprises a plurality of integrally formed vanes.

* * * * *